(12) United States Patent
Chen

(10) Patent No.: US 8,774,272 B1
(45) Date of Patent: Jul. 8, 2014

(54) VIDEO QUALITY BY CONTROLLING INTER FRAME ENCODING ACCORDING TO FRAME POSITION IN GOP

(75) Inventor: Lulin Chen, Cupertino, CA (US)

(73) Assignee: Geo Semiconductor Inc., Santa Clara, CA (US)

( * ) Notice: Subject to any disclaimer, the term of this patent is extended or adjusted under 35 U.S.C. 154(b) by 1797 days.

(21) Appl. No.: 11/182,164

(22) Filed: Jul. 15, 2005

(51) Int. Cl.
*H04N 7/12* (2006.01)
*H04N 7/50* (2006.01)

(52) U.S. Cl.
CPC ........................................ *H04N 7/50* (2013.01)
USPC ..................................................... 375/240.12

(58) Field of Classification Search
CPC ..................................................... H04N 7/50
USPC ..................................................... 375/240.12
See application file for complete search history.

(56) References Cited

U.S. PATENT DOCUMENTS

| | | | |
|---|---|---|---|
| 5,511,003 A | 4/1996 | Agarwal | |
| 5,627,590 A | 5/1997 | Hamano et al. | |
| 5,732,155 A | 3/1998 | Saito | |
| 5,742,347 A | 4/1998 | Kandlur et al. | |
| 5,796,441 A | 8/1998 | Oshita | |
| 5,825,680 A * | 10/1998 | Wheeler et al. | 708/650 |
| 6,148,031 A | 11/2000 | Kato | |
| 6,236,760 B1 | 5/2001 | Bagni et al. | |
| 6,259,736 B1 | 7/2001 | Chujoh et al. | |
| 6,317,518 B1 | 11/2001 | Enari | |
| 6,333,948 B1 | 12/2001 | Kurobe et al. | |
| 6,351,493 B1 | 2/2002 | Reed et al. | |
| 6,408,029 B1 | 6/2002 | McVeigh et al. | |
| 6,463,101 B1 | 10/2002 | Koto | |
| 6,625,215 B1 | 9/2003 | Faryar et al. | |
| 6,642,967 B1 | 11/2003 | Saunders | |
| 6,731,684 B1 | 5/2004 | Wu | |
| 6,865,374 B2 | 3/2005 | Kalluri | |
| 7,266,150 B2 * | 9/2007 | Demos | 375/240.15 |
| 2002/0181588 A1 * | 12/2002 | Okada | 375/240.12 |
| 2003/0169817 A1 | 9/2003 | Song et al. | |
| 2004/0028282 A1 * | 2/2004 | Kato et al. | 382/236 |
| 2005/0123044 A1 * | 6/2005 | Katsavounidis et al. | 375/240.12 |

OTHER PUBLICATIONS

U.S. Appl. No. 11/081,760, Wen.
USPTO, Office Action mailed Dec. 29, 2009 for U.S. Appl. No. 11/081,760.

* cited by examiner

*Primary Examiner* — Sath V Perungavoor
*Assistant Examiner* — James Pontius
(74) *Attorney, Agent, or Firm* — Sughrue Mion, PLLC

(57) ABSTRACT

In some embodiments, a video encoding method includes controlling a set of block encoding modes in a plurality of inter video frames in a group of pictures (GOP) according to a frame position in the group of pictures, to generally decrease a forward inter-encoded frame content with the frame position in the group of pictures. An encoding mode determination is made for inter-frame encoding blocks (e.g. macroblocks) according to the frame position in the group of pictures. The determination may include forcing a block encoding mode to an intra, backward inter-predicted, or backward strong-weighted bi-predicted mode. The determination may be performed according to a frame type (P/B), frame position in GOP, frame content, a selected temporal and spatial pattern, a bit cost of making an encoding mode decision, and an available bit rate. The fraction of mode-forced blocks is generally increased as the GOP frame position advances.

47 Claims, 6 Drawing Sheets

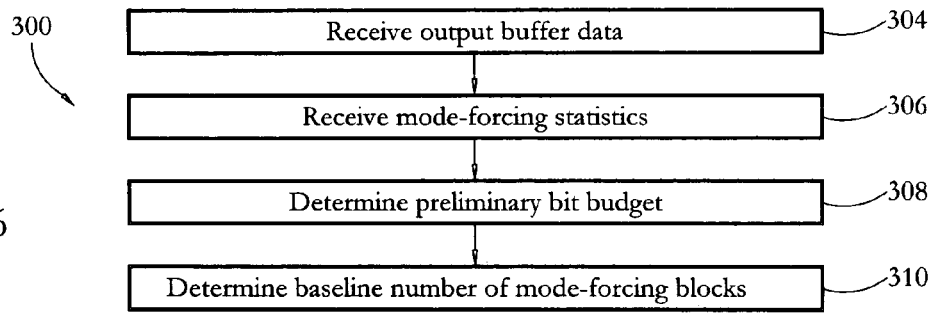
FIG. 6
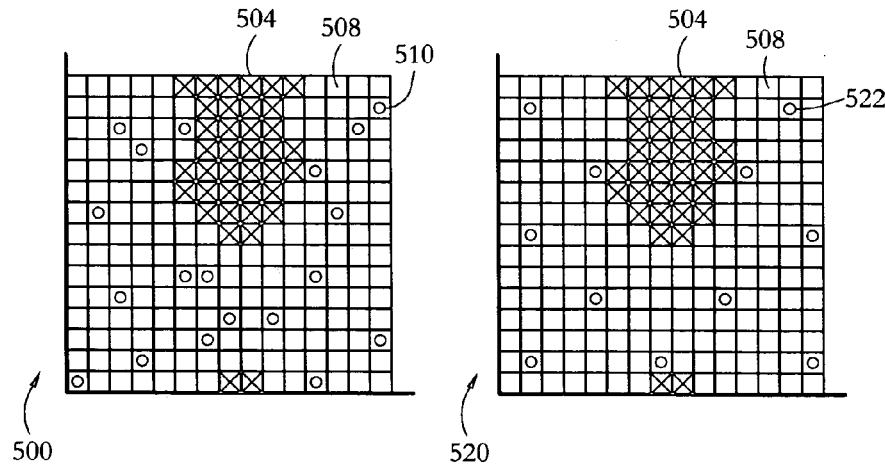
FIG. 8-A    FIG. 8-B

VIDEO QUALITY BY CONTROLLING INTER FRAME ENCODING ACCORDING TO FRAME POSITION IN GOP

BACKGROUND

The invention relates to data processing systems and methods, and in particular to video encoding systems and methods.

Commonly-used video encoding methods are based on MPEG (Moving Pictures Experts Group) standards such as MPEG-2, MPEG-4 (MPEG 4 Part 2) or H.264 (MPEG 4 Part 10). Such encoding methods typically employ three types of frames: I- (intra), P- (predicted), and B- (bidirectional) frames. An I-frame is encoded spatially using data only from that frame (intra-coded). P- and B-frames are encoded using data from the current frame and other frames (inter-coded). Inter-coding involves encoding differences between frames, rather than the full data of each frame, in order to take advantage of the similarity of neighboring frames in typical video sequences. A P-frame employs data from one other frame, often a preceding frame in display order. A B-frame employs data from two other frames, which may be preceding and/or subsequent frames. Frames used as a reference in encoding other frames are commonly termed anchor frames. In methods using the MPEG-2 standard, I- and P-frames can serve as anchor frames. In methods using the H.264 standard, I-, P-, and B-frames can serve as anchor frames.

Each frame is typically divided into multiple non-overlapping rectangular blocks. Blocks of 16×16 pixels are commonly termed macroblocks. Other block sizes used in encoders using the H.264 standard include 16×8, 8×16, 8×8, 8×4, 4×8, and 4×4 pixels. For each block in an inter-frame, a typical MPEG encoder searches for a corresponding, similar block in that inter-frame's anchor frame(s). If a sufficiently similar block is not found in the anchor frames, then the current block is intra-coded. If a similar block is found, the MPEG encoder stores residual data representing differences between the current block and the similar block in the anchor frame, as well as motion vectors identifying the difference in position between the blocks. The difference data is converted to the frequency domain using a transform such as a discrete cosine transform (DCT). The resulting frequency-domain data is quantized and variable-length (entropy) coded before storage/transmission.

Quantizing the data involves reducing the precision used to represent various frequency coefficients, usually through division and rounding operations. Quantization can be used to exploit the human visual system's different sensitivities to different frequencies by representing coefficients for different frequencies with different precisions. Quantization is generally lossy and irreversible. A quantization scale factor MQuant or quantization parameter Q can be used to control system bitrates as the visual complexity of the encoded images varies. Such bitrate control can be used to maintain buffer fullness within desired limits, for example. The quantization parameter is used to scale a quantization table, and thus the quantization precision. Higher quantization precisions lead to locally increased bitrates, and lower quantization precisions lead to decreased bitrates.

MPEG frames are typically organized in groups-of-pictures (GOPs). A GOP includes at least one I-frame, which is normally the first frame in the GOP. A closed GOP is one in which all predictions take place within the GOP; inter-frames do not use data from frames outside the GOP. Some MPEG applications may also use an open GOP structure, such as I-B-I-B-I- . . . . A closed GOP structure facilitates separating a bit stream into independently-decodable discrete parts.

FIG. 1 illustrates an exemplary frame sequence 20, shown in display order, including a closed GOP 22 and an immediately subsequent I-frame 24. GOP 22 includes an I-frame 26a and a number of subsequent B- and P-frames. A first P-frame 26c is inter-coded with reference to I-frame 26a, while a second P-frame 26d is inter-coded with reference to first P-frame 26c. A B-frame 26b is inter-coded with reference to I-frame 26a and P-frame 26c.

Inter-coded (P- and B-) frames may include both intra-coded and inter-coded blocks. For any given inter-frame block, the encoder can calculate the bit cost of encoding the block as an intra-coded block or as an inter-coded block. In some instances, for example in parts of fast-changing video sequences, inter-encoding may not provide encoding cost savings for some blocks, and such blocks can be intra-encoded. If inter-encoding provides desired encoding cost savings for a block, the block is inter-encoded.

Each inter-encoded block in a P-frame may be encoded with reference to a block in a preceding or subsequent frame, in display (temporal) order. Each inter-encoded block in a B-frame may be encoded with reference to one or two other frames. The reference frames can be before and/or after the frame to be encoded, in display order. If two reference frames are used, several temporal order combinations are possible: one past and one future reference frame, two past reference frames, and two future reference frames.

While MPEG-based video coding methods can yield remarkably-accurate representations of motion pictures, the human visual system can sometimes detect imperfections or artifacts in MPEG-encoded video sequences. Such artifacts can become particularly noticeable at relatively low system bandwidths.

SUMMARY

According to one aspect, a video data encoding method comprises controlling a set of block encoding modes in a plurality of inter video frames in a group of pictures according to a frame position in the group of pictures to generally decrease a forward inter-encoded frame content with the frame position in the group of pictures. The plurality of inter frames are encoded according to the set of block encoding modes.

According to another aspect, a video data encoding method comprises receiving video data for a plurality of inter frames in a group of pictures; making an encoding mode determination for each of a plurality of encoding blocks in each of the plurality of inter frames according to a position of said each of the plurality of inter frames in the group of pictures; and encoding each of the plurality of encoding blocks according to the encoding mode determination.

According to another aspect, a video data encoding method comprises receiving video data for a plurality of inter frames in a group of pictures; and controlling an intra-encoded content of the plurality of inter-frames according to a frame position in the group of pictures to increase the intra-encoded content with the frame position in the group of pictures.

According to another aspect, a video data encoding method comprises receiving video data for a plurality of inter frames in a group of pictures; and controlling a backward-predicted content of the plurality of inter-frames according to a frame position in the group of pictures to increase the backward-predicted content with the frame position in the group of pictures.

According to another aspect, a video data encoder integrated on a chip comprises a mode decision processor configured to make an encoding mode determination for each of a plurality of encoding blocks in each of a plurality of inter frames in a group of pictures according to a position of said each of the plurality of inter frames in the group of pictures; and video encoding logic connected to the mode decision processor and configured to encode said each of the plurality of encoding blocks according to the encoding mode determination.

BRIEF DESCRIPTION OF THE DRAWINGS

The foregoing aspects and advantages of the present invention will become better understood upon reading the following detailed description and upon reference to the drawings where:

FIG. 6 shows a sequence of steps performed by a rate/cost calculator of the encoder of FIG. 4, according to some embodiments of the present invention.

FIG. 8-A illustrates a part of a frame including a subset of frame macroblocks encoded in a spatially-random mode-forcing pattern.

FIG. 8-B illustrates a part of a frame including a subset of frame macroblocks encoded in a checkerboard spatial mode-forcing pattern.

DETAILED DESCRIPTION OF PREFERRED EMBODIMENTS

Figure 1:
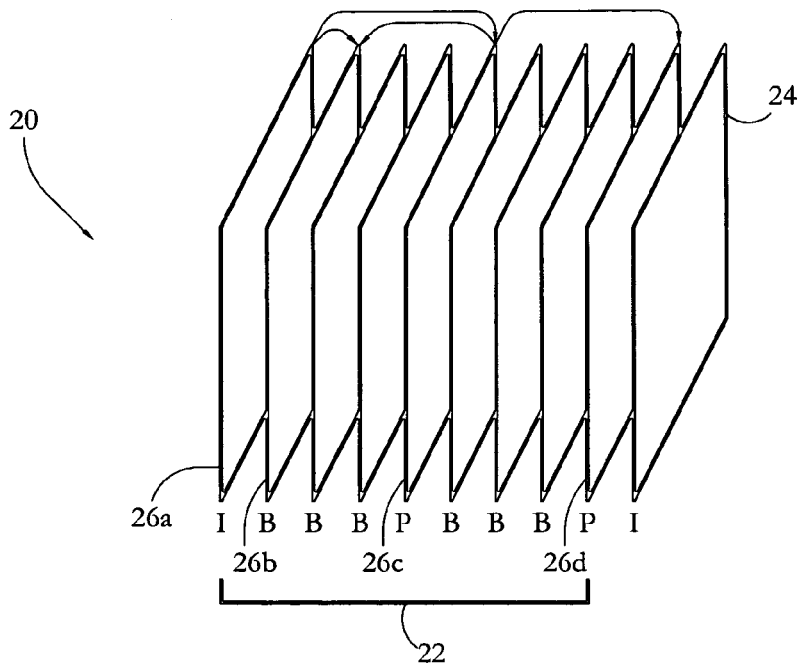
FIG. 1 illustrates an exemplary frame sequence including I, P, and B frames, shown in display order.

In the following description, it is understood that all recited connections between structures can be direct operative connections or indirect operative connections through intermediary structures. A set of elements includes one or more elements. Any recitation of an element is understood to refer to at least one element. The term "logic" refers to special-purpose hardware. Unless otherwise required, any described method steps need not be necessarily performed in a particular illustrated order. The statement that a second frame is anchored by a first frame means that the first frame serves as an anchor frame for the second frame. A first element (e.g. data) derived from a second element encompasses a first element equal to the second element, as well as a first element generated by processing the second element and optionally other data. The term block encompasses macroblocks (16×16 blocks), are well as blocks of other sizes, such as conventional macroblock partitions. Making a determination or decision according to a parameter encompasses making the determination or decision according to the parameter and optionally according to other data. Unless otherwise specified, an indicator of some quantity/data may be the quantity/data itself, or an indicator different from the quantity/data itself. An encoding mode for a block is understood to define operations performed on the block data, and not merely parameters for performed operations. Making an encoding mode determination for a subset of encoding blocks in a frame refers to making encoding mode determinations for one or more encoding blocks in the frame, and not to merely making a determination of the frame type (I, B, or P). Unless otherwise specified, any recited frame order is a display order, which may, but need not, coincide with an encoding order. Unless otherwise specified, backward-predicted content includes backward inter-predicted content and backward strong weighted bi-predicted content. A backward inter-predicted encoding mode is a mode in which current block data is encoded with reference to one or more temporally subsequent reference frame(s), and without reference to temporally precedent frames. Normally, backward inter-predicted blocks are encoded with reference to a single subsequent frame in P frames, and with reference to one or two subsequent frames in B frames. B-frame backward inter-predicted blocks encoded with reference to two reference frames may be encoded in a weighted or unweighted manner. A backward strong-weighted bi-predicted mode is a block encoded in a weighted manner with reference to a temporally preceding frame and a temporally subsequent frame, with the weight assigned to the subsequent reference frame data higher than the weight assigned to the preceding reference frame data. Unless otherwise specified, any recited encoder or decoder may be implemented using any combination of special-purpose encoding/decoding logic and/or software code running on a programmable (e.g. general-purpose) processor. Computer readable media encompass storage media such as magnetic, optic, and semiconductor media (e.g. hard drives, optical disks, flash memory, DRAM), as well as communications links such as conductive cables and fiber optic links.

The following description illustrates embodiments of the invention by way of example and not necessarily by way of limitation.

Figure 2:
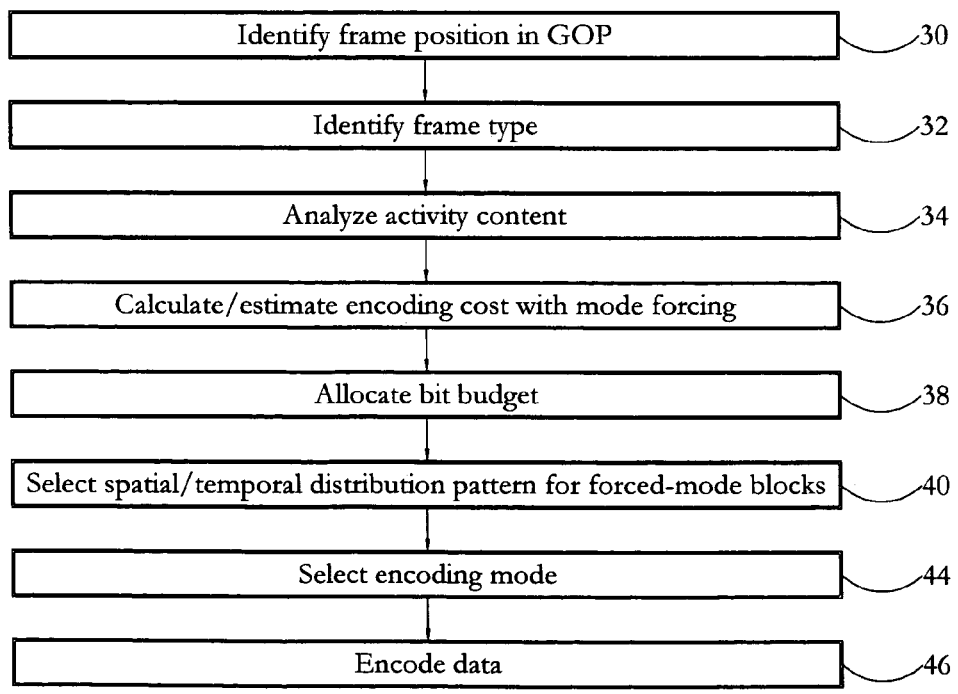
FIG. 2 shows a sequence of steps performed by a video image encoder according to some embodiments of the present invention.

FIG. 2 shows a sequence of steps performed by a video image encoder in encoding a current frame or region according to some embodiments of the present invention. In a first step 30, the encoder identifies a frame position within a current GOP for the current frame/region to be encoded. For an exemplary GOP size of 15, the frame position may range from 0 to 14, wherein frame number 0 is a first, intra-coded GOP frame. In a step 32, the encoder identifies the frame type (I, P, or B) for the current frame/region. In a step 34, the encoder analyzes the activity content of the current frame or frame region, and categorizes the activity content according to data such as motion, texture, and brightness. The encoder calculates or estimates the bit cost of encoding the current frame/region if mode-forcing as described below is applied to the frame/region (step 36). Several mode-forcing options, such as intra (I) and backward inter-predicted may be evaluated. Evaluated backward inter-predicted modes may include a single-reference frame mode, and bi-predicted reference modes using two subsequent frames or one subsequent and one precedent frame. In a step 38, the encoder allocates an overall frame bit budget, which depends on the number and encoding modes of forced-mode blocks. Generally, intra-encoded blocks need a higher bit budget than similar inter-encoded blocks. The encoder defines a spatial and temporal distribution for forced-mode blocks (step 40). Exemplary spatial distribution patterns include random and spatially periodic (checkerboard) patterns, for example. Exemplary temporal patterns include linear and non-linear patterns. In a linear pattern, the total number of forced-mode encoded blocks in a frame increases linearly with the frame position in the GOP.

In a step 44, the encoder selects an encoding mode for each block to be encoded. Selecting block encoding modes can include selecting between intra- and inter-encoding modes, and adjusting the backward-predicted contributions to block data to increase the contribution of backward predictions with GOP position, as described in detail below. For P-frames, selecting block encoding modes can include adjusting the numbers of intra-encoded blocks, and/or the numbers of backward inter-predicted blocks. P-frame backward inter-predicted blocks are encoded with reference to a temporally subsequent (in display order) reference frame. For B frames, selecting block encoding modes can include adjusting the numbers of backward inter-predicted blocks and backward strong-weighted bi-predicted blocks. Backward inter-predicted blocks in B-frames are encoded with reference to one or two temporally subsequent reference frames. Backward strong-weighted bi-predicted blocks are encoded in a weighted manner with reference to a temporally preceding frame and a temporally subsequent frame, with the weight assigned to the subsequent reference frame data higher than the weight assigned to the preceding reference frame data. The incoming video data is encoded according to the selected modes (step 46).

Figure 3:
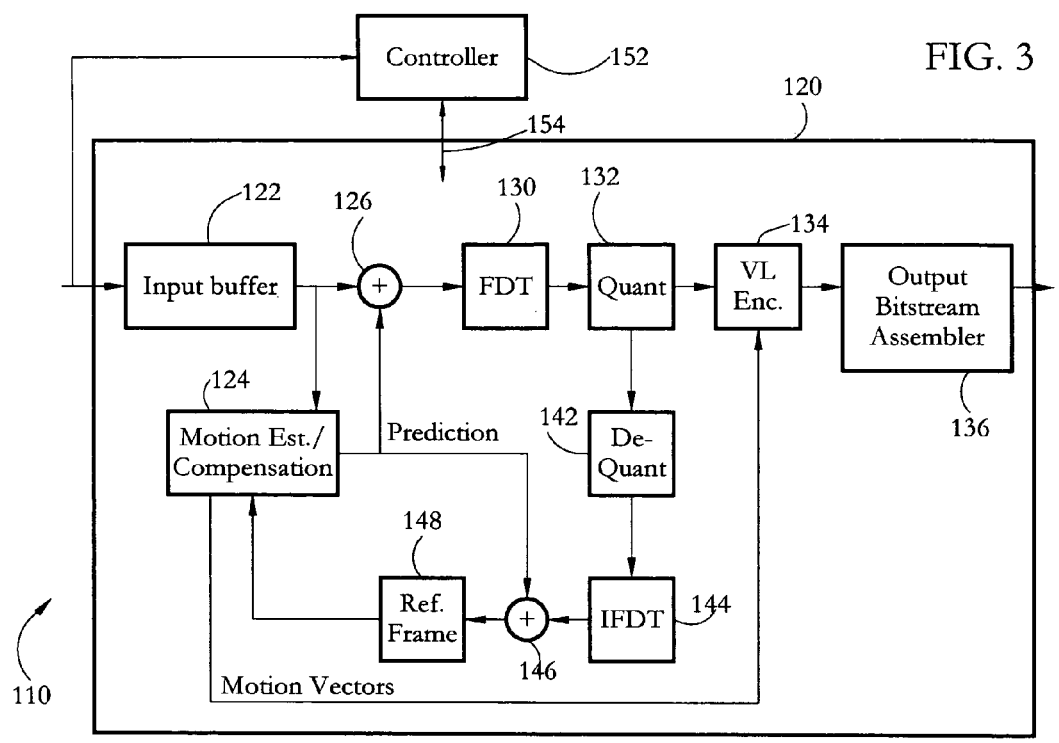
FIG. 3 is a schematic diagram of an exemplary MPEG encoder according to some embodiments of the present invention.

FIG. 3 is a schematic diagram of the structure of an exemplary MPEG encoder 110 according to some embodiments of the present invention. Encoder 110 generates a standard-compliant output bitstream, which is transmitted to a storage device or communications link for subsequent decoding by a video decoder. Encoder 110 can be implemented using special-purpose hardware, and/or software running on a programmable processor. In some embodiments, encoder 110 can be provided as part of a special-purpose integrated circuit controlling an operation of a device such as a digital video recorder. In some embodiments, encoder 110 can be implemented using software running on a general-purpose computer. In some embodiments, encoder 110 includes a special-purpose hardware encoding unit 120, and a software-programmable controller 152 controlling the operation of encoding unit 120. Controller 152 may include a general-purpose central processing unit (CPU), or a microcontroller such as a digital signal processor (DSP). Encoding unit 120 may be implemented using special-purpose hardware blocks (logic). In some embodiments, at least parts of encoding unit 120 can be implemented using software running on a programmable processor. Controller 152 is connected to various functional blocks of encoding unit 120, as illustrated by the connection arrow 154 FIG. 3. The various connections between the functional blocks shown in FIG. 3 may be implemented directly, or through one or more intermediary structures such as a data switch operating under the control of controller 152.

Encoding unit 120 includes an input buffer 122, which receives an input bit sequence, and an output bitstream assembler 136, which outputs a standard-compliant output bitstream. A number of functional blocks are connected in series between input buffer 122 and output bitstream assembler 136: a differential processing unit 126, a frequency-domain transform (FDT) unit 130, a quantization unit 132, and a variable length (entropy) encoder unit 134. A predictive part of the encoder includes a plurality of functional blocks connected between quantization unit 132 and input buffer 122: a de-quantization (inverse quantization) unit 142, an inverse frequency-domain transform (IFDT) unit 144, a differential processing unit 146, a reference frame storage unit 148, and a motion estimation/compensation unit 124. In some embodiments, encoding unit 120 may include functional units other than the units shown in FIG. 3, such as one or more functional units configured to perform intra-frame predictive encoding, and/or a de-blocking filter. An intra-frame prediction unit may be employed to generate intra-frame predictions for differentially encoding data with reference to other macroblocks in the same frame. A de-blocking filter may be connected to the output of differential processing unit 146, to reduce blocking distortions caused by dividing a frame into macroblocks for encoding.

Input buffer 122 receives an input bit sequence and buffers the input frame data for subsequent processing. Buffering is used for example for encoding P-frames or B-frames for which the encoding order may be different from the input/display orders. Controller 152 executes software instructions that control the operation of encoder 110, and in particular define block encoding modes and other encoding parameters for data to be encoded, as described below.

For inter-encoded data, differential processing unit 126 subtracts compensated coded anchor frame data from corresponding input frame data to generate residuals to be encoded. Intra-coded data is not processed by processing unit 126. FDT unit 130 transforms space-domain data (intra-encoded or residual data) into corresponding frequency-domain data. Quantization unit 132 quantizes the frequency-domain data using stored quantization table data and quantization parameters received from controller 152. Variable-length encoder 134 applies an entropy coding operator to quantized data received from quantization unit 132, and, for inter-coded frames, to motion vector data received from motion compensation unit 124.

Motion estimation/compensation unit 124 receives input uncompressed video data from input buffer 122 and reference frame data from reference frame storage unit 148, and outputs prediction and corresponding motion vector data. De-quantization unit 142 de-quantizes data received from quantization unit 132, and IFDT unit 144 applies an inverse discrete cosine transform operator to the resulting de-quantized data. Processing unit 146 adds prediction data received from motion compensation unit 124 to decoded residuals received from IFDT unit 144 to generate inter-encoded reference frames. Storage unit 148 stores decoded reference frames.

Intra-encoded frame data follow essentially a straight path through encoder 120, from frame switch/reordering unit 122 to bitstream assembler 136. For intra-frames serving as reference (anchor) frames, the intra-encoded data is decoded by de-quantization unit 142 and IFDT unit 144 to generate a reference frame, which is stored in reference frame storage unit 148.

For inter-coded frames, inter-coded blocks are encoded differentially, with respect to corresponding intra-coded reference frame blocks stored in reference frame storage unit 148. Intra-coded reference frame (prediction) data is subtracted from current frame data by processing block 126, and the resulting residuals are transformed by FDT unit 130, quantized by quantization unit 132, and encoded by variable-length encoder 134. If the inter-coded frame serves as an anchor frame, a reference frame is constructed by decoding the frame. Processing block 146 adds residual data generated by de-quantization unit 142 and IFDT unit 144 to intra-coded prediction data received from motion compensation unit 124 to generate the reference frame. The reference frame is stored in reference frame storage unit 148, and is used to encode other inter-encoded frames.

Figure 4:
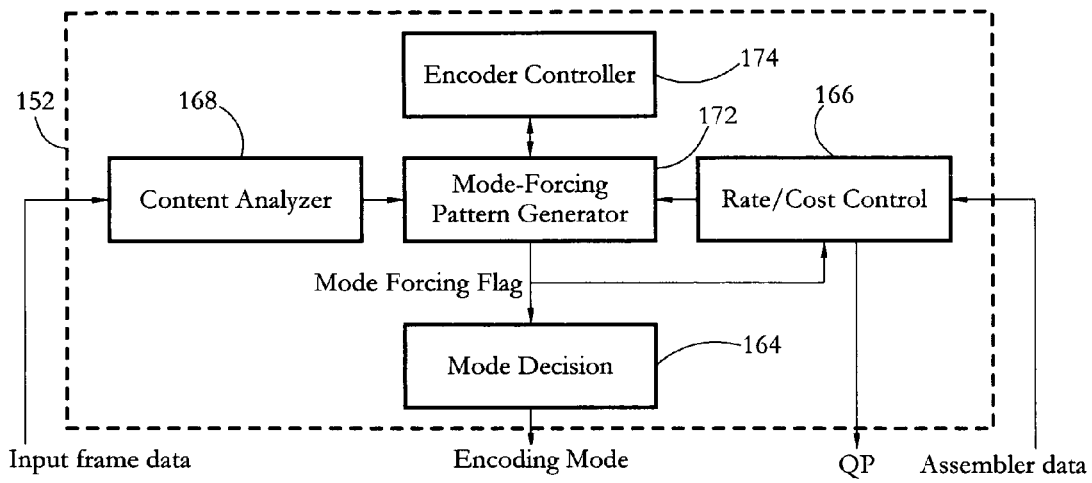
FIG. 4 is a schematic diagram of a controller of the encoder of FIG. 3, according to some embodiments of the present invention.

FIG. 4 illustrates schematically a flow of data through controller 152 according to some embodiments of the present invention. In some embodiments, the various functional blocks shown in FIG. 4 are implemented in software. In some embodiments, various illustrated functional blocks may be implemented using special-purpose hardware. A content analyzer 168 receives input frame data and analyzes the content of the received data. Content analyzer 168 generates motion, texture, and brightness indicators for each block to be encoded. A rate/cost controller 166 receives a set of mode-forcing statistics from a mode-forcing pattern generator 172, and bitstream assembler data from bitstream assembler 136 (shown in FIG. 3). Using the bitstream assembler data and the mode-forcing statistics, among others, rate/cost controller 166 calculates a baseline number of mode-forcing blocks for the GOP frames. Rate/cost controller 166 may also calculate quantization parameters (quantization scale factors) for use by quantization unit 132 (FIG. 3). Such computed quantization parameters may depend on block encoding modes, and the buffer fullness of output bitstream assembler 136 (FIG. 3).

Mode-forcing pattern generator 172 generates an encoding-mode forcing indicator for each block to be encoded. For example, the forcing indicator for a given block is set to 1 if the encoding mode for the block is to be forced as described below, and to 0 otherwise. Mode-forcing pattern generator 172 receives a set of content analysis results from content analyzer 168 and the preliminary desired number of mode-forcing blocks in the current frame from rate/cost controller 166. Mode-forcing pattern generator also receives a number of parameters from encoder controller 174, including a current frame GOP position, frame type (I, P, B), and a default mode-forcing spatial pattern (e.g. checkerboard, random) for the current frame. The mode-forcing indicators generated by mode-forcing pattern generator 172 are transmitted to a mode decision unit 164. Mode decision unit 164 uses the mode-forcing indicators to generate encoding mode indicators for the blocks to be encoded.

Figure 5:
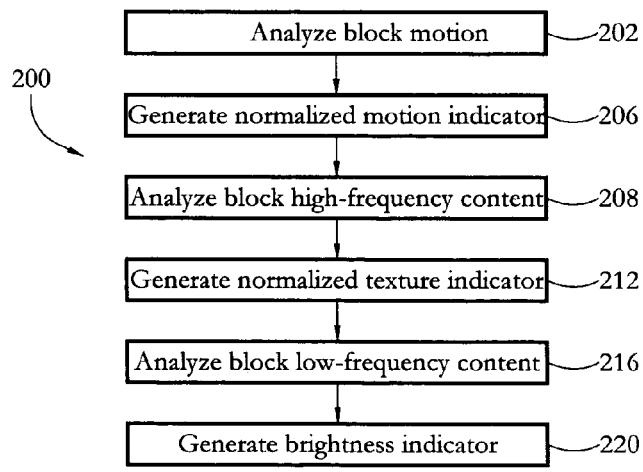
FIG. 5 shows a sequence of steps performed by a content analyzer of the encoder of FIG. 4, according to some embodiments of the present invention.

FIG. 5 shows a sequence of steps 200 performed by content analyzer 168 according to some embodiments of the present invention. Content analyzer 168 performs an analysis of the motion of each block to be encoded (step 202), and generates a resulting normalized motion indicator for the block (step 206). The motion analysis may include block-based motion analysis methods such as computing a motion vector magnitude for the block, as well as pixel-based motion analysis methods such as motion field or motion flow methods. In some embodiments, the normalized motion indicator is a number between 0 and an upper bound, for example a number between 0 and 10, wherein a higher motion indicator value indicates more motion. Content analyzer 168 performs an analysis of each block's high-frequency content (step 208), and generates a resulting normalized texture indicator for the block (step 212). Analyzing the block's high frequency content may include applying a frequency-domain transform to the block spatial-domain data, and summing the resulting frequency-domain data above a threshold frequency. Such a method may involve effectively applying a high-pass filter to the spatial-domain block data. High-frequency analysis may also include an edge detection method. In some embodiments, the normalized texture indicator is a number between 0 and an upper bound, for example a number between 0 and 10, wherein a higher texture indicator value indicates a texture richer in high-frequency content. Content analyzer 168 also performs an analysis of each block's low-frequency content (step 216), and generates a resulting brightness indicator (step 220). Analyzing the block's low frequency content may include summing the block's brightness in the spatial domain, and/or applying a low-pass filter to the spatial-domain block data. The block low-frequency content can also be characterized by a DC or other frequency-domain transform coefficients. In some embodiments, the normalized brightness indicator is a number between 0 and an upper bound, for example a number between 0 and 255, wherein a higher number indicates a brighter block.

FIG. 6 shows a sequence of steps 300 performed by rate/cost calculator 166 according to some embodiments of the present invention. In a step 304, rate/cost calculator 166 receives output buffer data from output bitstream assembler 136 (shown in FIG. 3). The output buffer data may include an indicator of the fullness of the output buffer of output bitstream assembler 136, as well as indicators of the numbers of bits used to encode one or more immediately preceding frames. In a step 306, rate/cost calculator 166 receives mode-forcing statistics from mode-forcing pattern generator 172 (shown in FIG. 4). In some embodiments, the mode-forcing statistics include statistics on the numbers of mode-forced blocks in one or more immediately preceding frames and/or GOPs. Rate/cost calculator 166 determines a preliminary frame bit to budget threshold (step 308). In some embodiments, the bit budget threshold depends on parameters such as buffer fullness and output bandwidth. The bit budget threshold can be defined as a function of the average bit budget available per frame. For example, for encoding a 2 Mbps output stream at 30 frames per second, the average bit budget available per frame is about 67 kb. A suitable bit budget threshold in such an application may include a value of about 67 kb, a linear function of 67 kb, or some function of 67 kB set to account for variations in required bit budgets per frame due to mode-forcing. The bit budget threshold generally may be set lower when the output buffer of output bitstream assembler 136 becomes fuller.

Rate/cost calculator 166 uses the bit budget threshold to determine a baseline number of mode-forced blocks for the frames in the current GOP (step 310). The baseline number is independent of frame position in the GOP. A temporal pattern is later applied to the baseline number to arrive at a GOP-position-dependent (temporally-adjusted) mode-forced block number for each frame, as described below. The baseline number of mode-forced blocks may be defined as a maximum number or an average number (among others) of mode-forced blocks per frame in the current GOP. If the baseline defines a maximum number, a subsequent temporal pattern may define position-dependent mode-forcing fractions between 0% and 100%, for example, where the percentages refer to fractions of the baseline number. If the baseline defines an average number, a subsequent temporal pattern may define position-dependent mode-forcing fractions between 0 and 180% or 225%, for example. In some embodiments, rate/cost calculator 166 employs the mode-forcing statistics received from mode-forcing pattern generator 172 to determine a dependence of encoding bit cost on mode-forced block numbers for a set of immediately-preceding frames/GOPs. Generally, a higher number of mode-forced blocks may lead to increased encoding processing and bit costs per block. The variation of bit cost with mode-forced block numbers in preceding frames is then used to estimate a dependence of bit costs on mode-forced block numbers for the current frame. Rate/cost calculator 166 is capable of adjusting the bit budgets allocated for frames in the current GOP to account for the increase in encoding costs resulting from mode-forcing. In some embodiments, rate/cost calculator 166 may generate estimates of encoding time costs in addition to estimates of encoding bit costs.

Figure 7:
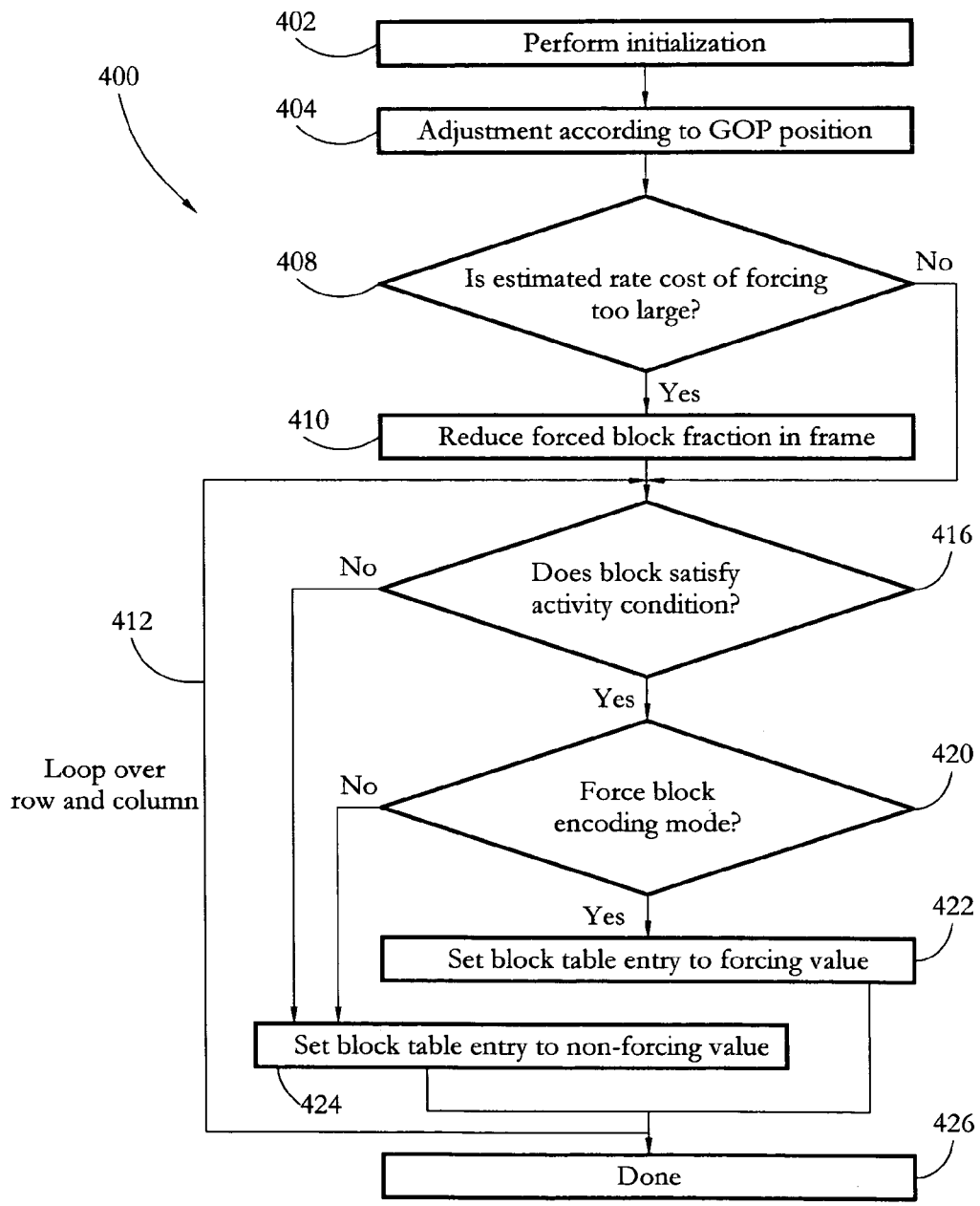
FIG. 7 shows a sequence of steps performed by a mode-forcing pattern generator of the encoder of FIG. 4, according to some embodiments of the present invention.

FIG. 7 shows a sequence of steps 400 performed by mode-forcing pattern generator 172 (FIG. 4) to generate a mode-forcing indicator table for a current frame, according to some embodiments of the present invention. In a step 402, pattern-generator 172 performs an initialization procedure for the current frame. The initialization may include determining or retrieving frame variables such as a frame type, frame position in GOP, bit budget threshold for the frame, baseline number of mode-forced blocks, mode-forced block fraction, and mode-forced block fraction step. A frame type indicator identifies whether the frame is an I-, P- or B-frame. A frame position indicator indicates the position of the current frame in the current group of pictures, e.g. whether the current frame is the $10^{th}$ frame in a GOP of 15 frames. The frame type and frame position in GOP are received from encoder controller 174 (FIG. 4), while the bit budget threshold for the frame and the baseline number of mode-forced blocks are received from rate/cost controller 166 (FIG. 4). The mode-forced block fraction and step are determined by mode-forcing pattern generator 172, as described below.

The mode-forced block fraction is a number between 0 and 1, defined as the temporally-adjusted number of mode-forced blocks divided by the total number of blocks in the current frame. For example, if a number of mode-forced macroblocks is 250 and the total number of macroblocks in the frame is 1350, the mode-forced block fraction is 250/1350=0.185. The mode-forced block fraction step is an empirically-determined fraction by which the mode-forced block fraction can be reduced to save bandwidth as described below. For example, in some embodiments the mode-forced block fraction step can be chosen to be about 0.02 or 2% of the total number of blocks in the frame, which corresponds to about 27 blocks in a frame having 1350 blocks.

In a step 404, the baseline number of mode-forcing blocks determined by rate/cost calculator 166 (FIG. 4) is adjusted according to the GOP position of the current frame to generate a temporally-adjusted mode-forcing block number or fraction. In some embodiments, the temporal adjustment is a linear one: the applied temporal adjustment increases linearly with the frame GOP position. For example, a temporally-adjusted mode-forcing block fraction can be set to 0% for an initial frame, to 50% for a final frame, and to linearly increasing numbers for frames in between. In some embodiments, the temporal adjustment may be a GOP-position-dependent scaling factor applied to the baseline number of mode-forcing blocks. In other embodiments, the temporal adjustment may be a new determination of a GOP-position-dependent number of mode-forcing blocks, which may be made subject to a cap determined by the baseline maximum number of mode-forcing blocks. In some embodiments, a temporal (GOP-position) adjustment is applied only for frames after a certain GOP position (e.g. only for frames following the fifth GOP frame). In some embodiments, a temporal adjustment can be applied for all frames in the GOP, increasing monotonically from the first inter-encoded frame to the last inter-encoded frame, which ordinarily immediately precedes an intra-encoded frame in a system using a closed-GOP structure. Non-linear temporal adjustment patterns may also be used in some embodiments. Such patterns may include stepwise patterns, as well as continuous patterns which increase faster or slower than linearly. Using high numbers of mode-forcing blocks may increase the average frame encoding cost, while lower numbers of mode-forcing blocks may not adequately address the fluctuations in visual perception quality that occur upon non-adjusted inter-intra frame transitions.

In a step 408, mode-forcing pattern generator 172 estimates the rate cost of encoding the current frame using the temporally-adjusted mode-forcing block number, and determines whether the rate cost of mode-forcing is too large. The rate cost estimate may be determined from the rate cost of encoding one or more previous frames, adjusted for the dependence of the rate cost on the number of mode-forced blocks. In some embodiments, the rate cost of mode-forcing is too large if the rate cost exceeds the bit budget threshold determined by rate/cost calculator 166 as described with reference to FIG. 6. If the estimated rate cost of mode-forcing is too large, the forced-mode block fraction is reduced by the mode-forced block fraction step (step 410). If the estimated rate cost of mode-forcing is not too large, the forced-mode block fraction is left unchanged. The mode-forced block fraction may be further reduced for subsequent frames. In some embodiments, the baseline number of mode-forced blocks may be reduced, so that the mode-forced block fraction for subsequent frames is reduced whenever the rate cost for one frame exceeds the bit budget threshold.

A subsequent sequence of steps 412 is performed sequentially for each block in the current frame to be encoded. In a step 416, the content analysis data generated by content analyzer 168 (FIG. 4) are used to determine whether a current block satisfies a content activity condition. Blocks that satisfy the content activity condition are deemed eligible for mode-forcing as described below. Blocks that do not satisfy the content activity condition are deemed ineligible for mode-forcing, and their corresponding mode-forcing table entry is set to a non-forcing value (step 424). In some embodiments, the content activity condition depends on motion, texture and brightness indicators received from content analyzer 168. For example, the content activity condition may be deemed to be satisfied when normalized motion, texture, and brightness indicators have values less than 3, 3, and 180, respectively, on scales of 0-10, 0-10, and 0-255, respectively. That is, if a block is deemed to be sufficiently static, smooth-textured, and dark, the block is deemed eligible for mode-forcing as described below. Generally, mode-forcing is performed preferentially in a content parameter space in which the human visual system (HVS) is particularly sensitive to coding artifacts. Blocks that display large motion, complex textures, or high brightness are deemed ineligible for mode-forcing.

In a step 420, if the current block is eligible for mode-forcing, mode-forcing pattern generator 172 determines whether to apply mode-forcing to the current block. In some embodiments, the mode-forcing determination is made according to a random spatial pattern. For each block, the mode-forcing determination is made by comparing a block-specific random number between 0 and 1 to the mode-forced block fraction, which is a fraction between 0 and 1 described above. In some embodiments, the mode-forcing determination is made according to a predetermined spatial distribution, such as a spatially-periodic checkerboard pattern. The x- and y-periods of the checkerboard patterns may be adjusted to achieve different desired mode-forced block fractions for a frame. A mode-forcing table entry (indicator) for the current block is then set to a forcing value (step 422) or a non-forcing value (step 424) according to the mode-forcing determination made in step 420. In some embodiments, a single forcing value is used in any given frame. For example, if only intra-encoded mode-forcing is used in a P-frame, a single forcing value can represent the mode-forcing. In some embodiments, the mode-forcing table for a frame may include multiple forcing values, each representing an encoding mode. For example, multiple forcing values may be used in a table for a B-frame in which multiple forced encoding modes are used.

Once a forcing mode table entry has been entered for each block in the current frame, the mode-forcing mode assignment function call is done (step 426).

FIG. 8-A illustrates a part of a frame 500 including a subset of frame blocks encoded with a spatially-random mode-forcing pattern as described above. For simplicity, the illustrated blocks are macroblocks having identical sizes. Generally, an encoder may allow blocks of different sizes. The illustrated blocks can be macroblocks (16×16 blocks). A set of active-content blocks 504 are not eligible for mode-forcing. From the remaining blocks, some blocks 508 are encoded without mode-forcing, while other blocks 510 are encoded with mode-forcing.

FIG. 8-B illustrates a part of a frame 520 including a subset of frame blocks encoded as described above, with a spatially-periodic mode-forcing pattern. Active blocks 504 are not eligible for mode-forcing, while blocks 508 are encoded without mode-forcing. A set of blocks 522 subjected to mode-forcing are spaced apart in a regular, periodic pattern.

Figure 9:
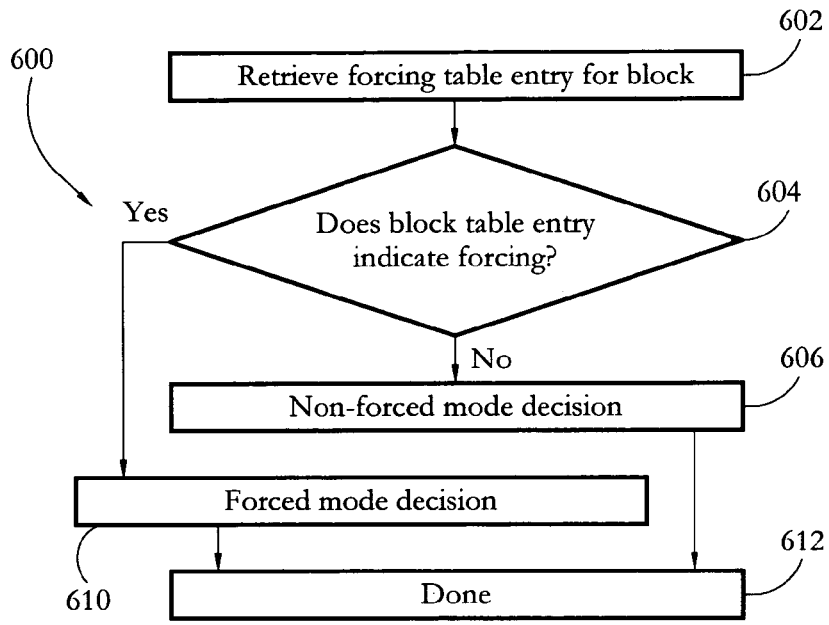
FIG. 9 shows a sequence of steps performed by a mode decision unit of the encoder of FIG. 4, according to some embodiments of the present invention.

FIG. 9 shows a sequence of steps 600 performed by mode decision unit 164 to determine an encoding mode for a given block, according to some embodiments of the present invention.

In a first step 602, mode decision unit 164 retrieves the mode-forcing indicator for the given block. In some embodiments, the mode-forcing indicator may be stored as a table entry of the form mode_forcing[row,column], where row and column denote a row and column for a corresponding macroblock. In a step 604, mode decision unit 164 determines whether the mode-forcing indicator has a forcing value or a non-forcing value. If the mode-forcing indicator for a block has a non-forcing value (e.g. 0), mode decision unit 164 performs a non-forced mode decision for the block (step 606). A non-forced mode decision may take into account the costs of encoding the data using various available encoding modes. A non-forced decision does not take into account the current frame position in its GOP. If the mode-forcing indicator for the block has a forcing value (e.g. 1), mode decision unit 164 performs a forced mode decision for the block (step 610). The mode-decision process is done (step 612) when an encoding mode has been selected for all blocks in a frame. The frame blocks are then encoded according to the selected encoding modes.

Figure 10:
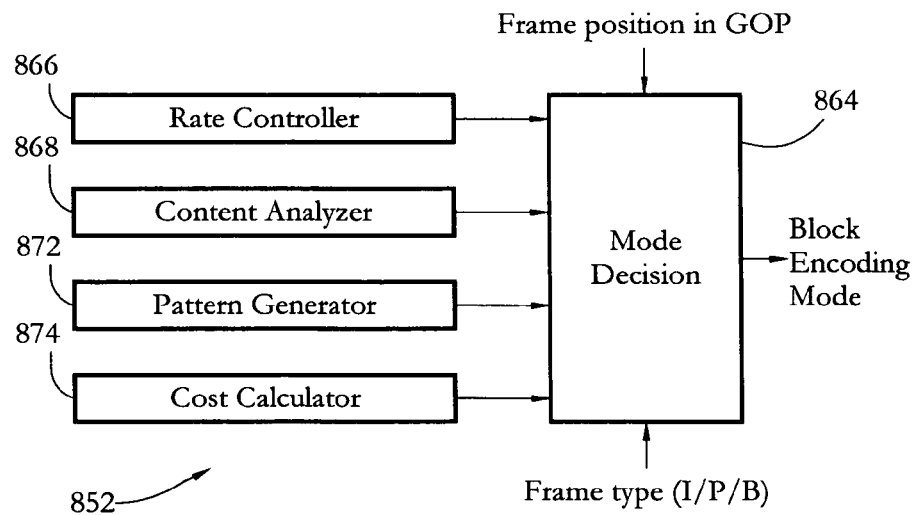
FIG. 10 is a schematic diagram of an alternative encoder controller according to some embodiments of the present invention.

FIG. 10 shows an encoder controller 852 according to some embodiments of the present invention. Encoder controller 852 may be implemented in software running on a programmable processor. Encoder controller 852 may also include special-purpose hardware. Encoder controller 852 includes a mode decision processor 864 connected to a rate controller 866, content analyzer 868, spatial and temporal mode-forcing pattern generator 872, and a cost calculator 874. Mode decision processor 864 receives rate/cost control date from rate controller 866, content analysis data from content analyzer 868, spatial and temporal mode-forcing patterns from mode-forcing pattern generator 872, and encoding cost data from cost calculator 874. Mode decision processor 864 employs the received data, in conjunction with a received frame type and frame position in the GOP, to generate an encoding mode indicator for each block to be encoded.

In a simple embodiment, the forced mode decision is to encode the current block as an intra-block. Such a mode-forcing decision may be used for both P- and B-frames, although in some embodiments intra-mode-forcing is only used in P frames. The net effect of the intra mode-forcing process is to control the fraction of intra-encoded blocks in inter-frames as a function of the frame position in the current GOP. The fraction of intra-encoded blocks is generally increased as the frame position in the GOP advances, so that frames closer to the end of the GOP have larger numbers of intra-encoded blocks.

In some embodiments, the forced-mode decision is to encode the current block as a backward inter-predicted block. The current block is encoded with reference to a block in one or two subsequent frames, in temporal order. Such a mode-forcing decision may be used for both P- and B-frames. In P frames, the inter-prediction is performed with reference to a single temporally subsequent reference frame. In B frames, the inter-prediction may be performed with reference to one or two temporally-subsequent reference frames. If two reference frames are used, the inter-prediction is commonly called bi-prediction (described below), which may be weighted or unweighted. The net effect of the backward inter-predicted mode-forcing process is to control the fraction of backward inter-predicted blocks in inter-frames as a function of the frame position in the current GOP. The fraction of backward inter-predicted blocks is generally increased as the frame position in the GOP advances, so that frames closer to the end of the GOP have larger numbers of backward inter-predicted blocks.

In some embodiments, the forced-mode decision is to encode the current block as a backward strong-weighted bi-predicted block. Such a mode-forcing decision is suitable for use in B frames. Bi-predicted blocks are encoded with reference to blocks in two different frames, which may be chosen from two lists (List0 and List 1, for example). One frame is chosen from List0, while the other from List 1. Two motion vectors are encoded, each corresponding to one of the reference blocks. Bi-predicted encoding may be performed according to the equation $$\mathrm{pred}(i,j)=(w0\mathrm{pred}0(i,j)+w1\mathrm{pred}1(i,j))/(w0+w1) \quad [1]$$

wherein pred(i,j) is the bi-predictive data to be encoded, and pred0(i,j) and pred1(i,j) are prediction samples derived from the List0 and List 1 reference frames. For weighted prediction, each prediction sample pred0(ij) or pred1(i,j) is scaled by a weighting factor w0 or w1, respectively, before motion-compensated prediction. For unweighted prediction, the weighting factors w0 and w1 are 1. The weighting factors may be calculated explicitly by the encoder, and transmitted in a slice header. The weighting factors may also be implicitly determined according to the temporal positions of the List0 and List 1 reference frames relative to the current frame or other factors. For example, if the current frame is temporally close to the reference frame, a relatively large weighting factor may be used, while a relatively smaller weighting factor may be used if the current frame is temporally further away from the reference frame.

For a backward strong-weighted bi-predictive encoded block, the prediction pred1(i,j) refers to a temporally subsequent frame, the prediction pred0(ij) refers to a temporally-precedent frame, and the weight w1 is larger than the weight w0. Mode-forcing a block to a backward strong-weighted bi-predictive mode may include assigning appropriate reference frames and/or prediction weights.

The net effect of the backward strong-weighted bi-predicted mode-forcing process is to control the fraction of backward strong-weighted bi-predicted blocks in inter-frames as a function of the frame position in the current GOP. The fraction of backward strong-weighted bi-predicted blocks is generally increased as the frame position in the GOP advances, so that frames closer to the end of the GOP have larger numbers of backward strong-weighted bi-predicted blocks.

In some embodiments, the mode-forcing regimes described above may be used exclusively or in combination in particular types of frames. For example, in some embodiments, only intra-encoding mode forcing is used in P-frames, while only backward strong-weighted bi-prediction forcing is used in B-frames. In other embodiments, both intra-encoding and to backward-inter-predicted mode-forcing are used in P-frames, while intra-encoding, backward inter-predicted, and backward strong-weighted bi-prediction forcing are used in B-frames. The mode-forcing regime choice may also be performed according to the outcome of a regular, non-forced mode-decision process. For example, if the non-forced decision process for a B-frame block selects a bi-predicted encoding mode, the mode-forcing value for the block can be set to select a backward inter-predicted mode (with reference to one or two reference frames), while if the non-forced decision process selects a forward inter-predicted mode, the mode-forcing value is set to select a backward strong-weighted bi-predicted mode.

The exemplary systems and methods described above allow a reduction in perceptually-annoying fluctuations in image quality for compressed bitstreams with GOP structures. Due to their different natures, intra- and inter-encoding techniques introduce compression artifacts that can be perceptually distinguishable by the human visual system. Intra-encoded frames in a video sequence can have significantly different visual quality than the rest of the frames in the video sequence. Furthermore, inter-encoding artifacts can propagate as the frame position in a GOP advances. As a result, the human visual system can sometimes detect periodic, visually-disturbing fluctuations in visual quality. Such fluctuations can be particularly noticeable at relatively low bandwidths.

Decreasing the forward inter-encoded content as the frame GOP position advances may effectively slow down the propagation of inter-encoding artifacts along the GOP, increase the frame correlation to subsequent frames and decrease the correlation to precedent frames, and lead to smoother perceived quality variations at GOP boundaries. The human visual system (HVS) perception of visual smoothness may be improved particularly for low bit rate applications. Decreasing the forward inter-encoded frame content may be achieved by increasing the frame fractions of intra-, backward inter-predicted, and backward strong-weighted bi-predicted blocks. In bi-predicted blocks using one forward and one backward reference frame, decreasing the forward inter-encoded frame content may also be achieved by decreasing the relative forward weighting coefficient and increasing the relative backward weighting coefficient. Such a shift in coefficient weighting may be used to generate both backward strong-weighted and forward strong-weighted bi-predicted blocks. Such a shift in relative weights effectively decreases reliance on past frames and increases reliance on future frames.

Applying mode-forcing preferentially to generally-static blocks having mid-range light intensity allows focusing the mode-forcing to image regions in which the human visual system is most sensitive to coding artifacts, and not in regions in which coding artifacts are relatively hard to detect.

It will be clear to one skilled in the art that the above embodiments may be altered in many ways without departing from the scope of the invention. Various hardware and software configurations and techniques can be used to implement GOP-position-dependent encoding as described above. In some embodiments the illustrated structures represent special-purpose logic blocks. In some embodiments, the described encoding/decoding functionality can be implemented using software running on a general-purpose processor. In some embodiments, a mode-forcing pattern generator and a rate/cost controller may be integrated as a single unit or software module. An encoder may generate directly a temporally-adjusted mode-forcing pattern, without temporally modulating a baseline mode-forcing block number common to a GOP. While the discussion above focused on discrete cosine transforms (DCT), other space-to-frequency-domain transforms (and their inverse transforms) such as Hadamard, Fourier or wavelet transforms can be used in some embodiments. In some embodiments, the operations described above with reference to block are performed for macroblocks (16× 16 blocks); in other embodiments, various operations may be performed for blocks of other sizes (e.g. 8×8, 4×8, and/or 4×4 macroblock partitions). Accordingly, the scope of the invention should be determined by the following claims and their legal equivalents.

What is claimed is:

1. A video data encoding method for encoding a plurality of inter video frames, each frame comprising a plurality of non-overlapping blocks, in a group of pictures; said method comprising:
determining blocks eligible for mode-forcing in each of the plurality of inter video frames in the group of pictures;
selecting a set of block encoding modes for the blocks eligible for mode-forcing, wherein a calculated or estimated rate cost of mode-forcing is within a pre-determined budget for the eligible blocks, wherein the rate cost is determined from a mode forcing fraction for bit processing applied to a prior frame of mode-forced blocks;
controlling the set of block encoding modes within a video encoder for the blocks eligible for mode-forcing according to a frame position in the group of pictures, independent of content within the blocks, wherein a fraction of blocks within each frame is forced to a forward inter-encoded frame content, such that the fraction of forward inter-encoded blocks within each frame decreases as the frame position advances in the group of pictures; and
encoding the plurality of inter frames according to the set of block encoding modes within the video encoder.

2. The method of claim 1, wherein controlling the set of block encoding modes comprises mode-forcing a block subset to an intra-encoding mode according to the frame position in the group of pictures.

3. The method of claim 1, wherein controlling the set of block encoding modes comprises mode-forcing a block subset to a backward inter-predicted encoding mode according to the frame position in the group of pictures.

4. The method of claim 3, wherein the backward-inter-predicted encoding mode is a single-reference-frame encoding mode.

5. The method of claim 3, wherein the backward inter-predicted encoding mode is a bi-predicted encoding mode.

6. The method of claim 1, wherein controlling the set of block encoding modes comprises mode-forcing a block subset to a backward strong-weighted bi-predicted mode according to the frame position in the group of pictures.

7. The method of claim 1, wherein controlling the set of block encoding modes comprises setting a number of mode-forced blocks in each of the plurality of inter frames.

8. The method of claim 1, wherein the blocks eligible for mode-forcing are selected from the plurality of inter video frames by a method comprising the steps of:
determining whether each of a plurality of encoding blocks in each of the plurality of inter frames conforms to a content activity condition; and
determining eligibility for mode-forcing an encoding mode for said each of the plurality of encoding blocks selectively only if said each of the plurality of encoding blocks conforms to the content activity condition.

9. The method of claim 1, further comprising:
generating a mode-forcing spatial pattern for said each of the plurality of inter frames; and
controlling the set of block encoding modes according to the mode-forcing spatial pattern.

10. The method of claim 9, wherein the mode-forcing spatial pattern is a spatially-random pattern.

11. The method of claim 9, wherein the mode-forcing spatial pattern is a spatially-periodic pattern.

12. The method of claim 1, further comprising:
generating a mode-forcing temporal pattern for the plurality of inter frames, wherein the mode-forcing temporal pattern defines a frame mode-forcing fraction that increases with the frame position in the group of pictures; and
controlling the set of block encoding modes according to the mode-forcing temporal pattern.

13. The method of claim 1, further comprising generating a mode-forcing table for each of the plurality of inter frames, the mode-forcing table comprising a mode-forcing entry for each of a plurality of encoding blocks in said each of the plurality of inter frames, the mode-forcing entry indicating an encoding mode determination for said each of the plurality of encoding blocks.

14. The method of claim 1, wherein the set of block encoding modes is a set of macroblock encoding modes.

15. The method of claim 1, wherein the plurality of inter frames includes at least three consecutive frames.

16. The method of claim 1, wherein said mode forcing fraction is configurable to vary from frame to frame depending on a rate cost of previous frames including mode-forced blocks.

17. A video data encoding method for encoding a plurality of blocks eligible for mode-forcing comprising:
receiving video data in a plurality of inter frames consisting of a plurality of non-overlapping blocks, in a group of pictures;
determining a plurality of encoding blocks eligible for mode-forcing in each of the plurality of inter video frames in the group of pictures,
selecting a set of block encoding modes for the blocks eligible for mode-forcing, wherein a calculated or estimated rate cost of mode-forcing is within a pre-determined budget for the eligible blocks, wherein the rate cost is determined from a mode forcing fraction for bit processing applied to a prior frame of mode-forced blocks;
making an encoding mode determination for each of the plurality of encoding blocks eligible for mode-forcing within a video encoder according to a position of said each of the plurality of inter frames in the group of pictures, independent of content within the blocks; and
encoding each of the plurality of encoding blocks eligible for mode-forcing within the video encoder according to the encoding mode determination.

18. The method of claim 17, wherein making the encoding mode determination comprises choosing an intra-encoding mode.

19. The method of claim 17, wherein making the encoding mode determination comprises choosing a backward inter-predicted mode.

20. The method of claim 19, wherein the backward-inter-predicted mode is a single-reference-frame encoding mode.

21. The method of claim 19, wherein the backward inter-predicted mode is bi-predicted encoding mode.

22. The method of claim 17, wherein making the encoding mode determination comprises choosing a backward strong-weighted bi-predicted mode.

23. The method of claim 17, the plurality of encoding blocks eligible for mode-forcing is selected from the plurality of inter video frames by a method comprising the steps of:
determining whether said each of the plurality of encoding blocks conforms to a content activity condition; and
making the encoding mode determination selectively only if said each of the plurality of encoding blocks conforms to the content activity condition.

24. The method of claim 17, further comprising:
generating a mode-forcing spatial pattern for said each of the plurality of inter frames; and
making the encoding mode determination according to the mode-forcing spatial pattern.

25. The method of claim 17, further comprising:
generating a mode-forcing temporal pattern for the plurality of inter frames, wherein the mode-forcing temporal pattern defines a frame mode-forcing fraction that increases with a frame position in the group of pictures; and
making the encoding mode determination according to the mode-forcing temporal pattern.

26. The method of claim 17, further comprising generating a mode-forcing table for said each of the plurality of inter frames, the mode-forcing table comprising a mode-forcing entry for said each of the plurality of encoding blocks, the mode-forcing entry indicating the encoding mode determination for said each of the plurality of encoding blocks.

27. The method of claim 17, wherein the plurality of inter frames includes at least three consecutive frames.

28. A video data encoding method for encoding a plurality of blocks eligible for mode-forcing comprising:
receiving video data within a video encoder for a plurality of inter frames consisting of a plurality of non-overlapping blocks, in a group of pictures;
determining a plurality of encoding blocks eligible for mode-forcing in each of the plurality of inter video frames in the group of pictures;
selecting a set of block encoding modes for the blocks eligible for mode-forcing, wherein a calculated or estimated rate cost of mode-forcing is within a pre-determined budget for the eligible blocks, wherein the rate cost is determined from a mode forcing fraction for bit processing applied to a prior frame of mode-forced blocks;
controlling an intra-encoded content of the plurality of inter-frames within the video encoder according to a frame position in the group of pictures, independent of content within the blocks, wherein a fraction of blocks within each frame is forced to the intra-encoded content, such that the fraction of intra-encoded blocks within each frame increases as the frame position advances in the group of pictures.

29. The method of claim 28, wherein the plurality of encoding blocks eligible for mode-forcing is selected from the plurality of inter video frames by determining whether each of a plurality of encoding blocks in each of the plurality of inter frames conforms to a content activity condition, and an encoding mode for said each of the plurality of encoding blocks is forced to an intra encoding mode only if said each of the plurality of encoding blocks conforms to the content activity condition.

30. The method of claim 28, further comprising:
generating a mode-forcing spatial pattern for each of the plurality of inter frames; and controlling the intra-encoded content of said each of the plurality of inter frames according to the mode-forcing spatial pattern.

31. The method of claim 30, further comprising:
generating a mode-forcing temporal pattern for the plurality of inter frames, wherein the mode-forcing temporal pattern defines a frame mode-forcing fraction that increases with the frame position in the group of pictures; and
making the encoding mode determination according to the mode-forcing temporal pattern.

32. The method of claim 31, further comprising generating a mode-forcing table for each of the plurality of inter frames, the mode-forcing table comprising a mode-forcing entry for each of a plurality of encoding blocks in said each of the plurality of inter frames, the mode-forcing entry indicating an encoding mode determination for said each of the plurality of encoding blocks.

33. The method of claim 28, wherein the plurality of inter frames includes at least three consecutive frames.

34. A video data encoding method for encoding a plurality of blocks eligible for mode-forcing comprising:
receiving video data within a video encoder for a plurality of inter frames consisting of a plurality of non-overlapping blocks, in a group of pictures;
determining a plurality of encoding blocks eligible for mode-forcing in each of the plurality of inter video frames in the group of pictures; and
selecting a set of block encoding modes for the blocks eligible for mode-forcing, wherein a calculated or estimated rate cost of mode-forcing is within a pre-determined budget for the eligible blocks, wherein the rate cost is determined from a mode forcing fraction for bit processing applied to a prior frame of mode-forced blocks;
controlling a set of block encoding modes within the video encoder to adjust a backward-predicted content of the plurality of inter-frames according to a frame position in the group of pictures, independent of content within the blocks, wherein a fraction of blocks within each frame is forced to the backward-predicted content, and the fraction of blocks within each frame increases as the frame position advances in the group of pictures, such that the frames closer to the end of the group of pictures have larger numbers of blocks associated with the backward-predicted content than the frames closer to the start of the group of pictures.

35. The method of claim 34, wherein controlling the backward-predicted content comprises controlling a backward inter-predicted content.

36. The method of claim 34, wherein controlling the backward-predicted content comprises controlling a backward strong-weighted bi-predicted content.

37. The method of claim 34, wherein the plurality of encoding blocks eligible for mode-forcing is selected from the plurality of inter video frames by determining whether each of a plurality of encoding blocks in each of the plurality of inter frames conforms to a content activity condition, and an encoding mode for said each of the plurality of encoding blocks is forced to a backward-predicted mode only if said each of the plurality of encoding blocks conforms to the content activity condition.

38. The method of claim 34, further comprising:
generating a mode-forcing spatial pattern for each of the plurality of inter frames; and
controlling the backward-predicted content of said each of the plurality of inter frames according to the mode-forcing spatial pattern.

39. The method of claim 38, further comprising:
generating a mode-forcing temporal pattern for the plurality of inter frames, wherein the mode-forcing temporal pattern defines a frame mode-forcing fraction that increases with the frame position in the group of pictures; and
making the encoding mode determination according to the mode-forcing temporal pattern.

40. The method of claim 39, further comprising generating a mode-forcing table for each of the plurality of inter frames, the mode-forcing table comprising a mode-forcing entry for each of a plurality of encoding blocks in said each of the plurality of inter frames, the mode-forcing entry indicating an encoding mode determination for said each of the plurality of encoding blocks.

41. A video encoding method for encoding a plurality of blocks eligible for mode-forcing comprising:
determining eligibility of blocks for mode-forcing by calculating or estimating rate cost of the mode-forcing and comparing against a pre-determined budget;
selecting a set of block encoding modes for the blocks eligible for mode-forcing, wherein the calculated or estimated rate cost of mode-forcing is within the pre-determined budget for the eligible blocks, wherein the rate cost is determined from a mode forcing fraction for bit processing applied to a prior frame of mode-forced blocks;
for the plurality of blocks eligible for mode-forcing in a plurality of inter video frames in a group of pictures, controlling a set of block encoding modes within a video encoder to force a fraction of blocks with each frame to a forward inter-encoded frame content, wherein the fraction of blocks within each frame is reduced as the frame position advances in the group of pictures, independent of content within the blocks, such that the frames closer to the end of the group of pictures have smaller numbers of blocks associated with the forward inter-encoded frame content than the frames closer to the start of the group of pictures; and
encoding the plurality of inter frames within the video encoder.

42. A video data encoder for encoding a plurality of blocks eligible for mode-forcing comprising:
a cost calculator for determining eligibility of blocks for mode-forcing by calculating or estimating rate cost of the mode-forcing and comparing against a pre-determined budget;
a selecting unit configured to select a set of block encoding modes for the blocks eligible for mode-forcing, wherein the calculated or estimated rate cost of mode-forcing is within a pre-determined budget for the eligible blocks, wherein the rate cost is determined from a mode forcing fraction for bit processing applied to a prior frame of mode-forced blocks;
a mode decision processor configured to make an encoding mode determination for each of a plurality of encoding blocks eligible for mode-forcing in each of a plurality of inter frames in a group of pictures according to a position of said each of the plurality of inter frames in the group of pictures, independent of content within the blocks; and
a video encoding logic connected to the mode decision processor and configured to encode said each of the plurality of encoding blocks eligible for mode-forcing according to the encoding mode determination.

43. The encoder of claim 42, wherein the plurality of inter frames includes at least three consecutive frames.

44. The encoder of claim 42, further comprising a rate controller connected to the mode decision processor and configured to determine a mode-forcing content fraction for each of the plurality of inter frames, wherein the mode decision processor is configured to make the encoding mode determination according to the mode-forcing content fraction.

45. The encoder of claim 44, further comprising a mode-forcing pattern generator connected to the mode decision processor and configured to generate a mode-forcing spatial pattern for said each of the plurality of inter frames; the mode decision processor being configured to make the encoding mode determination according to the mode-forcing spatial pattern.

46. The encoder of claim 44, further comprising a content analyzer connected to the mode-decision processor and configured to determine whether said each of the plurality of encoding blocks conforms to a content activity condition, wherein the mode decision processor is configured to make the encoding mode determination selectively only if said each of the plurality of encoding blocks conforms to the content activity condition.

47. A video data encoder for encoding a plurality of blocks eligible for mode-forcing comprising:

means for receiving video data for a plurality of blocks eligible for mode-forcing in a plurality of inter frames in a group of pictures;

means for determining eligibility of blocks for mode-forcing by calculating or estimating rate cost of the mode-forcing and comparing against a pre-determined budget;

means for selecting a set of block encoding modes for the blocks eligible for mode-forcing, wherein the calculated or estimated rate cost of mode-forcing is within a pre-determined budget for the eligible blocks, wherein the rate cost is determined from a mode forcing fraction for bit processing applied to a prior frame of mode-forced blocks;

means for making an encoding mode determination for each of a plurality of encoding blocks eligible for mode-forcing in each of the plurality of inter frames according to a position of said each of the plurality of inter frames in the group of pictures, independent of content within the blocks.

* * * * *